US012062065B2

(12) United States Patent
Holtan

(10) Patent No.: US 12,062,065 B2
(45) Date of Patent: *Aug. 13, 2024

(54) SYSTEMS AND METHODS FOR ALLOCATING ELECTRONIC ADVERTISING OPPORTUNITIES

(71) Applicant: Yahoo Ad Tech LLC, Dulles, VA (US)

(72) Inventor: Hans Marius Holtan, San Jose, CA (US)

(73) Assignee: Yahoo Ad Tech LLC, New York, NY (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/344,914

(22) Filed: Jun. 10, 2021

(65) Prior Publication Data
US 2021/0304247 A1 Sep. 30, 2021

Related U.S. Application Data

(63) Continuation of application No. 11/984,244, filed on Nov. 15, 2007, now Pat. No. 11,062,351.

(51) Int. Cl.
G06Q 30/0251 (2023.01)
G06Q 10/0637 (2023.01)

(52) U.S. Cl.
CPC ..... G06Q 30/0251 (2013.01); G06Q 10/0637 (2013.01)

(58) Field of Classification Search
None
See application file for complete search history.

(56) References Cited

U.S. PATENT DOCUMENTS 5,636,346 A 6/1997 Saxe
5,724,521 A 3/1998 Dedrick
(Continued)

FOREIGN PATENT DOCUMENTS

JP 2000-163477 6/2000
WO WO 98/58334 12/1998

OTHER PUBLICATIONS

AdSense, worldwide web, https://www.google.com/adsense/www/en_US/adsense_application.html, printed from the internet on Nov. 15, 2007.
(Continued)

Primary Examiner — Matthew S Gart
Assistant Examiner — Liz P Nguyen
(74) Attorney, Agent, or Firm — Bookoff McAndrews, PLLC

(57) ABSTRACT

A system, apparatus, and method are presented for allocating for allocating advertisements for display are provided that include collecting a plurality of advertising spaces, each advertising space having at least one associated advertising space variable; collecting a media inventory, the media inventory comprising a plurality of advertisements, each advertisement having at least one associated advertisement variable; receiving a bid price and a target inventory percentage for each advertisement: receiving a request for an advertisement to be placed at a specified advertising space; identifying advertisements in the media inventory that are qualified to receive an impression at the specified advertising space; creating a qualified advertisement ranking by sorting the qualified advertisements by bid price; selecting advertisements from the qualified advertisement ranking until the sum of target inventory percentages of selected advertisements is equal to or greater than 100 percent; and (Continued)

allocating advertising impressions to the selected advertisements.

15 Claims, 5 Drawing Sheets

(56) References Cited

U.S. PATENT DOCUMENTS

| | | | |
|---|---|---|---|
| 5,848,396 A | 12/1998 | Gerace | |
| 5,918,014 A | 6/1999 | Robinson | |
| 5,930,762 A | 7/1999 | Marsh | |
| 5,948,061 A | 9/1999 | Merriman et al. | |
| 6,006,197 A | 12/1999 | D'Eon et al. | |
| 6,009,410 A | 12/1999 | LeMole et al. | |
| 6,012,051 A | 1/2000 | Sammon et al. | |
| 6,085,229 A | 7/2000 | Newman et al. | |
| 6,119,098 A | 9/2000 | Guyot et al. | |
| 6,144,944 A | 11/2000 | Kurtzman et al. | |
| 6,161,127 A | 12/2000 | Cezar et al. | |
| 6,216,129 B1 | 4/2001 | Eldering | |
| 6,236,975 B1 | 5/2001 | Boe et al. | |
| 6,285,985 B1 | 9/2001 | Horstmann | |
| 6,285,987 B1 | 9/2001 | Roth et al. | |
| 6,314,451 B1 | 11/2001 | Landsman et al. | |
| 6,317,761 B1 | 11/2001 | Landsman et al. | |
| 6,317,782 B1 | 11/2001 | Himmel et al. | |
| 6,353,849 B1 | 2/2002 | Linsk | |
| 6,370,578 B2 | 4/2002 | Revashetti et al. | |
| 6,442,529 B1 | 8/2002 | Krishan et al. | |
| 6,453,347 B1 | 9/2002 | Revashetti et al. | |
| 6,470,079 B1 | 10/2002 | Benson | |
| 6,477,509 B1 | 11/2002 | Hammons et al. | |
| 6,477,575 B1 | 11/2002 | Koeppel et al. | |
| 6,487,538 B1 | 11/2002 | Gupta | |
| 6,560,578 B2 | 5/2003 | Eldering | |
| 6,567,786 B1 | 5/2003 | Bibelnicks | |
| 6,591,238 B1 | 7/2003 | Nakamura et al. | |
| 6,601,041 B1 | 7/2003 | Brown et al. | |
| 6,850,252 B1 | 2/2005 | Hoffberg | |
| 6,907,566 B1 | 6/2005 | McElfresh et al. | |
| 6,925,441 B1 | 8/2005 | Jones et al. | |
| 6,963,850 B1 | 11/2005 | Bezos et al. | |
| 7,010,497 B1 | 3/2006 | Nyhan et al. | |
| 7,039,599 B2 | 5/2006 | Merriman et al. | |
| 7,150,030 B1 | 12/2006 | Eldering | |
| 7,304,428 B2 | 12/2007 | Federspiel et al. | |
| 7,613,700 B1 | 11/2009 | Lobo et al. | |
| 7,698,165 B1 | 4/2010 | Tawakol et al. | |
| 7,792,698 B1 | 9/2010 | Veach et al. | |
| 7,805,331 B2 | 9/2010 | Demir et al. | |
| 7,822,636 B1 | 10/2010 | Ferber et al. | |
| 7,908,238 B1 | 3/2011 | Nolet et al. | |
| 8,301,649 B1 | 10/2012 | Hansen | |
| 2001/0014868 A1 | 8/2001 | Herz et al. | |
| 2002/0072965 A1 | 6/2002 | Merriman et al. | |
| 2003/0083931 A1 | 5/2003 | Lang | |
| 2003/0182250 A1 | 9/2003 | Sihidehpour et al. | |
| 2003/0233357 A1 | 12/2003 | Merenda et al. | |
| 2004/0267806 A1 | 12/2004 | Lester | |
| 2005/0021403 A1 | 1/2005 | Ozer et al. | |
| 2006/0271389 A1* | 11/2006 | Goodman | G06Q 30/02 |
| | | | 705/1.1 |
| 2007/0011078 A1 | 1/2007 | Jain et al. | |
| 2007/0153737 A1 | 7/2007 | Singh et al. | |
| 2008/0046316 A1 | 2/2008 | Shah et al. | |
| 2008/0065479 A1 | 3/2008 | Tomlin et al. | |
| 2008/0154858 A1* | 6/2008 | Manavoglu | G06Q 30/02 |
| 2008/0263578 A1 | 10/2008 | Bayer et al. | |
| 2009/0119172 A1 | 5/2009 | Soloff | |
| 2009/0132363 A1 | 5/2009 | Powell et al. | |
| 2009/0171721 A1 | 7/2009 | LeBaron et al. | |
| 2010/0257053 A1 | 10/2010 | Ferber et al. | |
| 2011/0282751 A1 | 11/2011 | Kwon et al. | |
| 2012/0130798 A1 | 5/2012 | Cooley et al. | |
| 2013/0046617 A1 | 2/2013 | Ferber et al. | |
| 2013/0046618 A1 | 2/2013 | Ferber et al. | |
| 2013/0046627 A1 | 2/2013 | Ferber et al. | |
| 2013/0046630 A1 | 2/2013 | Ferber et al. | |
| 2013/0054347 A1 | 2/2013 | Ferber et al. | |
| 2013/0054352 A1 | 2/2013 | Ferber et al. | |
| 2013/0097010 A1 | 4/2013 | Ferber et al. | |
| 2013/0097012 A1 | 4/2013 | Ferber et al. | |
| 2013/0097019 A1 | 4/2013 | Ferber et al. | |
| 2013/0097026 A1 | 4/2013 | Ferber et al. | |
| 2013/0097030 A1 | 4/2013 | Ferber et al. | |

OTHER PUBLICATIONS

Quigo Technologies, Inc., AdSonar, worldwide web, http://quigo.com/asfa.htm, printed from the internet on Nov. 8, 2007.
Right Media, worldwide web, http://www.rightmedia.com, printed from the internet on Nov. 8, 2007.
Michael, J. Grebeck et al., U.S. Appl. No. 12/314,323 for "Systems and Methods for Determining Bids for Placing Advertisements," filed Dec. 8, 2008.
Ali Nasir Amini et al., U.S. Appl. No. 11/819,058 for "Adaptive Lag Compensated Prediction of Future Success Rate," filed Jun. 25, 2007.
"BidAnalyzer: A Method for Estimation and Selection of Dynamic Bidding Models," Marketing Science: vol. 27, No. 6, Nov.-Dec. 2008, pp. 949-960.
Estimating Stochastic Volatility Option Pricing Models with Kalman Filtering: Department of Accounting and Finance, Monash University, Australia; Feb. 20, 2008.
Phelim P. Boyle and Ton Vorst "Option Replication in ?Discrete Time with Transaction Costs," the Journal of Finance, vol. 47, No. 1 (Mar. 1992) pp. 271-293.
Holtan, Hans Marius, U.S. Appl. No. 11/984,244 for "Systems and Methods for Allocating Electronic Advertising Opportunities," filed Nov. 15, 2007.
Office Action U.S. Appl. No. 13/612,621, mail date Dec. 2, 2013.
Office Action U.S. Appl. No. 13/705,028, mail date Nov. 15, 2013.
Office Action U.S. Appl. No. 13/705,056, mail date Nov. 21, 2013.
Office Action U.S. Appl. No. 13/612,631, mail date Aug. 22, 2013.
Office Action U.S. Appl. No. 13/612,625, mail date Nov. 7, 2013.
Office Action U.S. Appl. No. 13/620,899, mail date Oct. 24, 2013.
Office Action U.S. Appl. No. 13/620,902, mail date Oct. 15, 2014.
Office Action U.S. Appl. No. 13/620,907, mail date Oct. 24, 2013.
Office Action U.S. Appl. No. 13/696,000, mail date Oct. 24, 2013.
Office Action U.S. Appl. No. 09/610,197; mail date Jun. 23, 2003.
Office Action U.S. Appl. No. 09/610,197; mail date Mar. 1, 2004.
Office Action U.S. Appl. No. 09/610,197; mail date Nov. 4, 2004.
Office Action U.S. Appl. No. 09/610,197; mail date Mar. 31, 2005.
Office Action U.S. Appl. No. 09/610,197; mail date Oct. 24, 2005.
Office Action U.S. Appl. No. 09/610,197; mail date Jul. 27, 2006.
Office Action U.S. Appl. No. 09/610,197; mail date Mar. 16, 2007.
Office Action U.S. Appl. No. 09/610,197; mail date Nov. 27, 2007.
Office Action U.S. Appl. No. 09/610,197; mail date Jul. 28, 2008.
Office Action U.S. Appl. No. 09/610,197; mail date Apr. 6, 2009.
Office Action U.S. Appl. No. 09/610,197; mail date Jun. 24, 2010.
Office Action U.S. Appl. No. 13/612,621; mail date Mar. 22, 2013.
Office Action U.S. Appl. No. 13/612,625; mail date Mar. 15, 2013.
Office Action U.S. Appl. No. 13/620,899; mail date Feb. 14, 2013.
Office Action U.S. Appl. No. 13/620,902; mail date Feb. 5, 2013.
Office Action U.S. Appl. No. 13/620,907; mail date Jan. 31, 2013.
Office Action U.S. Appl. No. 13/696,000; mail date Feb. 15, 2013.
Office Action U.S. Appl. No. 13/705,028; mail date Feb. 25, 2013.
Office Action U.S. Appl. No. 13/705,056; mail date Jun. 21, 2013.
Office Action U.S. Appl. No. 13/705,059; mail date Jun. 21, 2013.
Office Action U.S. Appl. No. 13/705,066; mail date May 10, 2013.

* cited by examiner

| Advertisement ID | Bid Price | Target Inventory % |
|---|---|---|
| $ID_1$ | $b_1$ | $p_1$ |
| $ID_2$ | $b_2$ | $p_2$ |
| $ID_3$ | $b_3$ | $p_3$ |
| . | . | . |
| . | . | . |
| . | . | . |

Fig. 3: Bid Table

SYSTEMS AND METHODS FOR ALLOCATING ELECTRONIC ADVERTISING OPPORTUNITIES

CROSS-REFERENCE TO RELATED APPLICATION(S)

This patent application is a continuation of and claims the benefit of priority to U.S. Nonprovisional application Ser. No. 11/984,244, filed on Nov. 15, 2007, which is incorporated herein by reference in its entirety.

FIELD OF THE INVENTION

This application relates generally to advertising. Principles consistent with embodiments of the present invention relate to facilitating the interaction of parties engaged in electronic market transactions, and more specifically, to allocating electronic advertising opportunities to a plurality of advertisers in an economically efficient manner.

BACKGROUND OF THE INVENTION

Since the early 1990's, the number of people using the World Wide Web has grown at a substantial rate. As more users take advantage of the World Wide Web, they generate higher volumes of traffic over the Internet. As the benefits of commercializing the Internet can be tremendous, businesses increasingly take advantage of this traffic by advertising their products or services on-line. These advertisements may appear in the form of leased advertising space (e.g., "banners") on websites or as advertisements presented to digital television users, which are comparable to rented billboard space in highways and cities or commercials broadcasted during television or radio programs.

Before users browse to a particular web page, there is much unknown to potential advertisers that may place advertisements on that page. For instance, advertisers do not know how many users will browse to particular web pages, and therefore do not know the volume of advertisements (the number of "impressions") they will be able to place. Further, they do not know how many users will select or "click" on each advertisement, how many sales or other types of "conversions" will result from each display or impression of an advertisement, or what the ratio of clicks to conversions may be.

A problem for a facilitator of electronic advertising is choosing how to allocate an inventory of advertising spaces among a plurality of available advertisements. Advertisers, which supply advertising content, may benefit from impressions (e.g., to increase awareness of a brand), clicks (e.g., to provide additional information about a product), or conversions (e.g., to make sales or sign up new users for services, etc.). Advertisers may pay, on the other hand, per impression, per click, or per conversion, regardless of whether or not the item they are paying for (e.g., impressions, clicks, etc.) is the item that benefits them. Therefore, a facilitator of electronic advertising wishes to allocate advertisements among the inventory of advertising space in a way that maximizes the facilitator's profit.

One approach to allocating advertisements utilizes a system similar to a sealed-bid second-price auction, whereby a bid for a particular advertising space is associated with each qualified advertisement. In such an auction, the advertisement with the highest bid wins the space, but the price paid for the advertising space is equal to the second-highest bid, rather than the winning bid.

One limitation of a sealed-bid second-price auction as applied to electronic advertising is that it assumes that each advertiser makes a separate bid for each single advertising space. However, in many electronic advertising contexts, such a model is not practical because, e.g., the volume of impressions is very high, and an advertiser may wish to only purchase a portion of the available impressions or advertising space inventory that match the advertiser's desired variables.

It is accordingly an object of the invention to overcome the shortcomings of current advertising space inventory allocation techniques.

SUMMARY OF THE INVENTION

In accordance with the invention, systems, apparatuses, and methods for allocating advertisements for display are provided that include collecting a plurality of advertising spaces, each advertising space having at least one associated advertising space variable; collecting a media inventory, the media inventory comprising a plurality of advertisements, each advertisement having at least one associated advertisement variable; receiving a bid price and a target inventory percentage for each advertisement: receiving a request for an advertisement to be placed at a specified advertising space; identifying advertisements in the media inventory that are qualified to receive an impression at the specified advertising space; creating a qualified advertisement ranking by sorting the qualified advertisements by bid price; selecting advertisements from the qualified advertisement ranking until the sum of target inventory percentages of selected advertisements is equal to or greater than 100 percent; and allocating advertising impressions to the selected advertisements.

In some embodiments systems may further comprise allocating advertisements for display comprising: a component configured to collect a plurality of advertising spaces, each advertising space having at least one associated advertising space variable; for a component configured to collect a media inventory, the media inventory comprising a plurality of advertisements, each advertisement having at least one associated advertisement variable; a component configured to receive a bid price and a target inventory percentage for each advertisement; a component configured to receive a request for an advertisement to be placed at a specified advertising space in the advertising inventory; a component configured to identify all advertisements in the media inventory that are qualified to receive an impression at the specified advertising space; a component configured to create a qualified advertisement ranking by sorting the qualified advertisements in descending order by bid price; a component configured to select advertisements from the qualified advertisement ranking until the sum of target inventory percentages of selected advertisements is equal to or greater than 100 percent; and a component configured to allocate an advertising impression to the selected advertisement.

In some embodiments method, systems, and apparatuses for allocating advertisements for display may include a publisher interface for receiving a plurality of advertising spaces from a plurality of publishers of online content, each advertising space having at least one associated advertising space variable; an advertiser interface for receiving a media inventory, comprising advertisements from a plurality of advertisers, each advertisement having at least one associated advertisement variable; and an exchange for: determining a bid price and a target inventory percentage for each advertisement in the media inventory; receiving a request for an advertisement to be placed at a specified advertising space; identifying qualified advertisements based on variables associated with the plurality of advertisements and the plurality of advertising spaces; creating a qualified advertisement ranking by sorting the qualified advertisements in descending order by bid price; selecting advertisements from the beginning of the qualified advertisement ranking until the sum of target inventory percentages of selected advertisements is equal to or greater than 100 percent; and allocating an advertising impression to the selected advertisement.

In some embodiments, systems, apparatuses, and methods may further comprise creating a qualified advertisement ranking by sorting qualified advertisements in descending order by bid price, wherein a qualified advertisement is an advertisement whose at least one advertisement variable matches the at least one advertising space variable of the specified advertising space; and selecting advertisements from the top of the qualified advertisement ranking until the sum of the target inventory percentages of all selected advertisements is equal to or greater than 100%.

In some embodiments, systems, apparatuses, and methods may further comprise collecting advertising data related to a performance of the plurality of advertisements, the plurality of advertising spaces, at least one advertiser, and at least one publisher; and calculating the bid price based on the at least one advertising space variable associated with the specified advertising space, the at least one advertisement variable associated with each advertisement, and the advertising data.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain principles of the invention.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings:

FIG. 3 is an exemplary bid table showing a ranking of advertisement bid data consistent with embodiments of the present invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 1A:
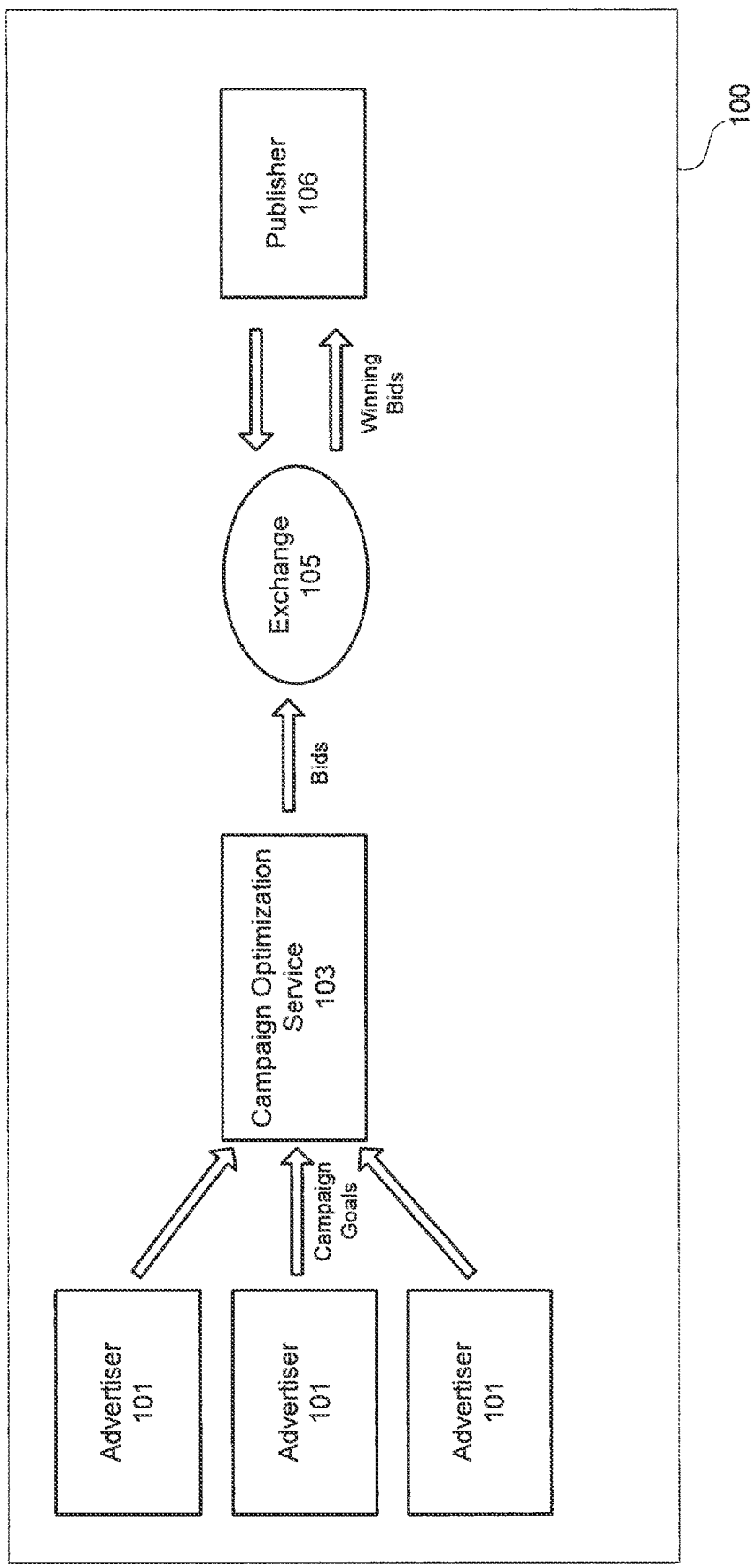
FIG. 1a is a block diagram of an advertising exchange system consistent with embodiments of the present invention.

FIG. 1a is a block diagram of an advertising exchange system consistent with embodiments of the present invention. As shown in FIG. 1a, system 100 may include advertiser 101, campaign optimization service 103, exchange 105, and publisher 106. An advertiser 101 creates one or more advertisements, such as a webpage banner advertisement or a slogan, to be presented on advertising spaces, such as webpages or displays of personal digital assistants. A publisher 106 may control (e.g., own or manage) an inventory of many advertising spaces on which advertisements may be placed. A publisher 106 may be, e.g. a website or a particular web page, or any entity that controls an electronic advertising space. Campaign optimization service 103 may be a software program and/or a computer server for formulating a bidding strategy for each advertising campaign of advertiser 101 and continually communicating bid information to exchange 105. Exchange 105 may be a software program and/or a computer server for continually receiving bid information from campaign optimization service 103, continually receiving requests to supply a publisher 106 with advertisement bids, and continually submitting winning advertising bids to publisher 106. In some embodiments, the functions of campaign optimization service 103 and exchange 105 may be performed by the same software program or computer server. In other embodiments, publisher 106 may function as campaign optimization service 103 and exchange 105. The operation of these components is described in greater detail below in reference to FIG. 1b.

Figure 1B:
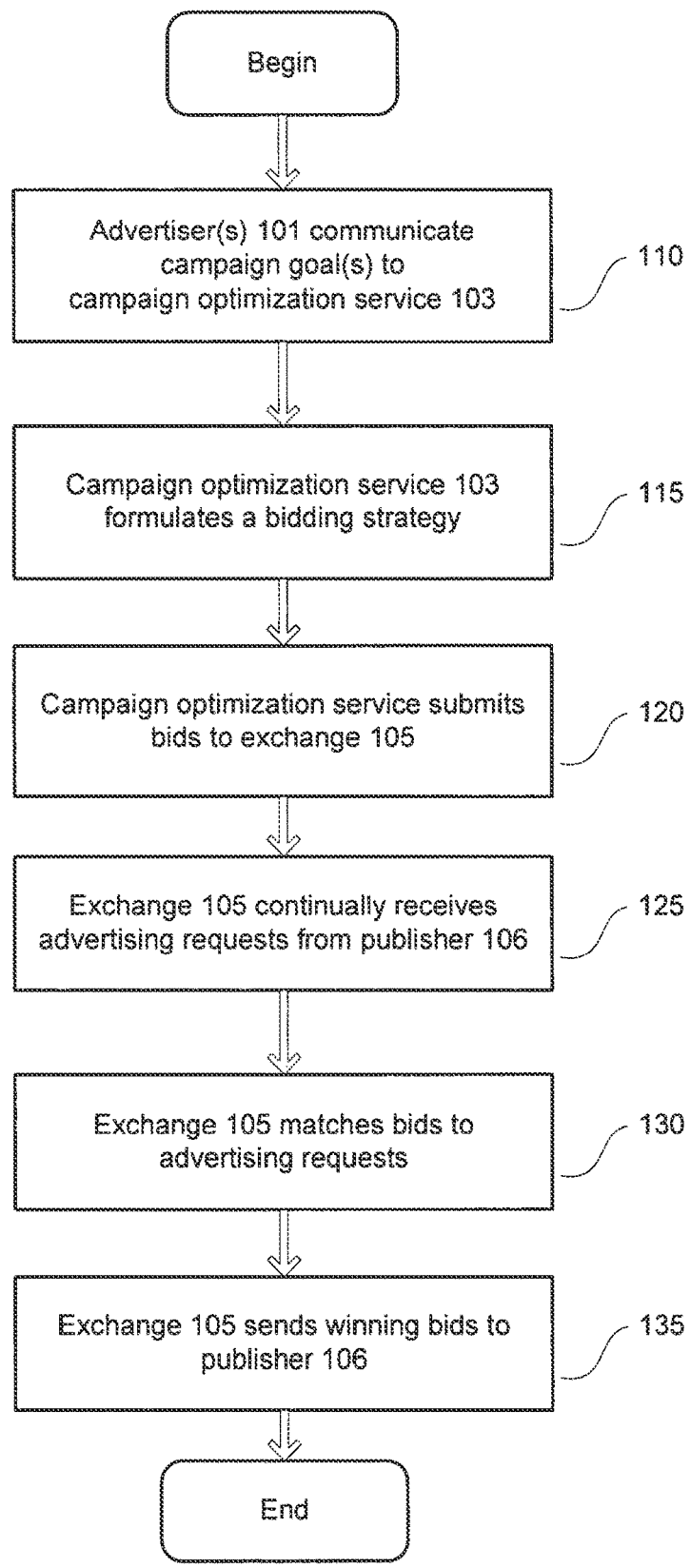
FIG. 1b is a flowchart of an advertising exchange system consistent with embodiments of the present invention.

FIG. 1b is a flowchart of an advertising exchange system consistent with embodiments of the present invention. At step 110, advertiser 101 communicates a campaign goal for at least one advertising campaign to a campaign optimization service 103. A campaign goal may define its associated advertising campaign by setting one or more advertiser-specified target variables for the associated advertising campaign. An advertising campaign, then, may be thought of as a set of user-specified campaign goals related to a particular advertisement or set of advertisements. Target variables may be any combination of, e.g., advertising publication, publication type, connection speed, browser type, geographic region of the connection's IP address, industry, seasonal or other calendar or time restraints, or any other distinguishing feature. Target variables may also include leadback variables. Leadback variables may be associated with a user action and typically occur in two types of situations. The first type of situation occurs when a user has previously accessed, or clicked on an advertisement. The second type of situation occurs when a user has previously visited a certain advertising space, for example, a webpage and may be determined when the user has visited an advertising space a given number of times within a time period. Additionally, target variables may be based on the frequency a user observes advertisements within a time period. For example, advertisements may be limited such that a user will only observe an advertisement twice or three times a day. Target variables may also be based on type of content of an advertising space, or demographic information, such as gender, age, income. Such variables may belong to advertising spaces, advertisements, advertisers, publishers, ends users, and/or other parties. In some embodiments, variables may be conceptually further divided into profile variables, which describe information associated with an end user such as geography and demographics, and contextual variables, which describe the context in which an advertiser, publisher, or third party appears.

At step 115, campaign optimization service 103 formulates a bidding strategy for each advertising campaign of advertiser 101 by creating bids to be submitted to an exchange 105. A bid may combine advertiser-specified target variables with optimization target variables designed to maximize efficiency and profitability of the advertising exchange service. For example, a bid may consist of a description of target variables desired, a maximum price advertiser 101 is willing to pay for each advertisement displayed in an advertising space, and the maximum request volume advertiser 101 is willing to buy for the bid. In some embodiments, the maximum request volume may be a percentage of all available advertising spaces matching the bid variables. In other embodiments, the maximum request volume may be represented differently, e.g., as a total number of advertising requests in a specified period of time. At step 120, campaign optimization service 103 submits bids to exchange 105. In certain embodiments, the bids may be submitted continuously.

At step 125, exchange 105 continually receives advertising requests from a publisher 106. In certain embodiments, the requests are received continuously. An advertising request may specify a particular advertising space or a group of advertising spaces available to be matched with an advertisement or advertisements. At step 130, exchange 105 matches bids from campaign optimization service 103 with advertising requests from publisher 106 based on target variables found in the bids and the actual variables associated with advertising requests. At step 135, exchange 105 sends winning bids to publisher 106. In some embodiments, step 135 may include the publisher communicating information about the advertisement associated with a winning bid. Publisher 106 may then retrieve the selected advertisement from its own server or another location. In other embodiments, step 135 may include sending the winning advertisements themselves to publisher 106. In some embodiments, advertiser 101 may manage some or all of its own bids and communicate directly with exchange 105 and/or publisher 106 with respect to bids for one or more of its advertising campaigns. In some embodiments, exchange 105 may utilize an allocation system similar to the one described below with respect to FIG. 2. In other embodiments, exchange 105 may use any algorithm suitable for selecting one or more winning advertisements from a plurality of advertisement bids for a plurality of requests to fill advertising spaces.

Figure 2:
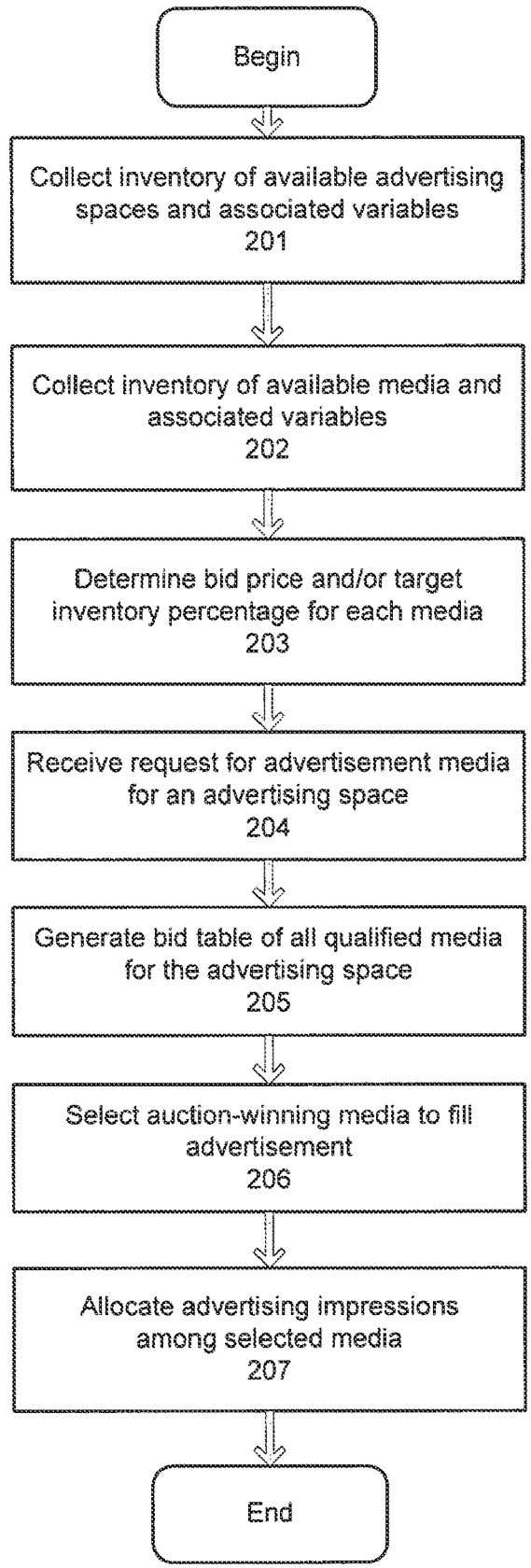
FIG. 2 is a flowchart of a system for allocating electronic advertising opportunities consistent with embodiments of the present invention.

FIG. 2 is a flowchart of a system for allocating electronic advertising opportunities consistent with embodiments of the present invention. At step 201, an advertising system collects an inventory of advertising spaces and associated variables. In order to facilitate allocating advertisements among advertising spaces, it is necessary to collect information about the inventory based on observable variables. For example, variables may be any combination of advertising publication, publication type, connection speed, browser type, geographic region of the connection's IP address, industry, seasonal or other calendar or time restraints, or any other distinguishing feature. Such variables may be attributes of advertising spaces, advertisements, advertisers, publishers, end users, and/or other parties.

In some embodiments, variables may be conceptually further divided into profile variables, which describe information associated with an end user such as geography and demographics, and contextual variables, which describe the context in which an end user, advertiser, publisher, or third party may appear. An example of a contextual variable is a particular web site or web page. In some embodiments, variables may be further categorized as public variables, which are available to all parties and users of the system, and private variables, to which access may be restricted.

In some embodiments, some variables may be "owned" by advertisers, publishers, end users, an advertising network, or other parties. Ownership of a variable means that a variable's owner or owners may access or utilize a particular type of variable information. In some embodiments, targeting based on private variables can be restricted to those who have paid for the privilege of accessing those variables. As an example, variables provided by a browser are likely to be public variables. However, a cookie placed by an advertiser that labels a particular end user may be a private variable because only the advertiser that placed the cookie or a party that has permission from that advertiser may read and target variables saved in the cookie. In some embodiments, advertisers, publishers, end users, or other parties may choose whether to make variables they own public or private. In some embodiments, private variables may always be read by the exchange system.

In some embodiments, variables may be represented by one or more hierarchies. For example, a zip code, which belongs to a county, which belongs to a state, etc; and Standard Industrial Classification (SIC) codes, which describe advertisers or other commercial companies based on categories.

The lifespan of variables may vary greatly. For example, geographic and SIC codes are likely to exist and be relevant for many years into the future, while other variables may be relevant for only a very short time (e.g., a variable indicating a short-term promotion). As the number of variables in the system may conceivably become very high, in some embodiments long-term variables and short-term variables may be treated differently.

Referring again to FIG. 2, at step 202 the advertising system collects advertisements from advertisers. These advertisements may have associated target variables, as described above. As discussed above, an advertiser may target a variable only if the variable is public or if the advertiser has permission to access that variable. In some embodiments, advertisers may submit different combinations of variables with the same advertisement, and the system may treat each advertisement/variable combination as a discrete advertisement.

At step 203, a bid price and a target inventory percentage may be determined for each submitted advertisement based on the advertisement's associated target variables. The bid price may be the maximum price the advertiser of a particular advertisement is willing to pay for each advertising request. The target inventory percentage may be the maximum percentage of inventory that matches the variables that the advertiser is willing to purchase. In some embodiments, for an advertisement in inventory to be considered to match a set of variables, the advertisement must match all target variables. In other embodiments, an advertisement may be considered a match if it matches a single target variable or a defined percentage of target variables.

In some embodiments, the bid price and/or target inventory percentage may be determined by the advertising system and/or campaign optimization service 103 as described above. In some embodiments, the bid price and/or target inventory percentage may be calculated using algorithms that utilize data collected by the system about the success and value of previous advertising campaigns and advertisements.

In other embodiments, the advertiser may submit the bid price and/or target inventory percentage for a particular advertisement, thus reducing or eliminating the necessity for the system to calculate those numbers at step 203.

At step 204, the system receives a request from a publisher for an advertisement to fill a specified advertising space. In order to fill the request, at step 205, the system identifies all qualified advertisements, e.g., those advertisements whose target variables match the variables of the specified advertising space. The system then generates a bid table listing all qualified advertisements, ranked in descending order according to bid price.

An example of such a bid table according to embodiments of the present invention is shown in FIG. 3. The bid table may have three columns: advertisement ID, bid price, and target inventory percentage. The advertisement ID may be an identifier used to uniquely identify each advertisement available in the system. The bid price and target inventory percentage columns may represent the concepts described above. In other embodiments, the bid table may incorporate other variables and/or qualified advertisements may be ranked according to variables other than bid price.

Referring again to FIG. 2, in some embodiments, advertisements are selected from the top of the bid table at step 206 one-by-one until the sum of the target inventory percentages of the selected advertisement is equal to or greater than 100%. In some embodiments, if two or more advertisements have the same bid price and the addition of any one of such advertisements would cause the sum target inventory percentage of selected advertisements to be greater than or equal to 100%, all such advertisements become selected advertisements.

In some embodiments, impressions for the specified advertising space are then allocated at step 207. In certain embodiments, advertisements may be allocated randomly among selected advertisements without regard to the target inventory percentage for each advertisement. In other embodiments, impressions for the specified advertising space are allocated in proportion to the target inventory percentage for each selected advertisement, with the last-selected advertisement receiving only the percentage required for the total sum of inventory percentages of selected advertisements to equal 100%.

In some embodiments, all selected advertisements pay the same price per impression. This price is called the clearing price. In some embodiments, the clearing price is defined as (1) the price of the bid that makes the sum of the percentages go from less than 100% to greater than 100%, or (2) if the sum of the exactly 100%, the highest price of the bids that did not get selected. In other embodiments, the clearing price may be determined in a different manner. In other embodiments, for each impression, the advertiser may be charged at the maximum bid price for the selected advertisement, meaning that the cost of placing an advertisement in the same advertising space may differ by each impression according to the advertisement being displayed.

In embodiments, the ordering of advertisements according to bid price or any other variable may be carried out continuously or at any time during the process of FIG. 2, for example, before a request is received from a publisher in step 204.

In some embodiments, further controls may be implemented that may affect the allocation of impressions among selected advertisements. Variables of advertisers or advertising spaces may limit advertisements based on a nearly infinite variety of categories. For example, a publisher may limit the percentage of impressions that may be filled by a single advertiser or a single advertisement. Such a limit may be implemented, for example, by publisher, by advertising space, by web page, and/or by a time period, among other variables.

In some embodiments, the advertiser may be given the option to reject unwanted inventory won by the advertiser at auction. For each advertisement, an advertiser may specify an actual interest percentage in addition to the target inventory percentage. In the case of an advertiser winning an auction, an option percentage may be defined as the difference between the target inventory percentage and the actual interest percentage. The advertiser would then have the option to reject all or a portion of the option percentage, which would then be allocated by the system amongst the remaining selected advertisements.

FIG. 3 shows an exemplary bid table showing a ranking of advertisement bid data consistent with embodiments of the present invention. This exemplary bid table includes three columns: Advertisement ID ($ID_x$). Bid Price ($b_x$), and Target Inventory Percentage ($p_x$). In certain embodiments, all qualified advertisements may be sorted and placed into a bid table in decreasing order according to the bid price $b_x$. Advertisement ID $ID_x$ is a unique identifier assigned to each available advertisement. Target Inventory $p_x$ may be a maximum percentage the owner of advertisement ID, is willing to buy of advertising positions whose variables match the target variables of advertisement $ID_x$.

Figure 4:
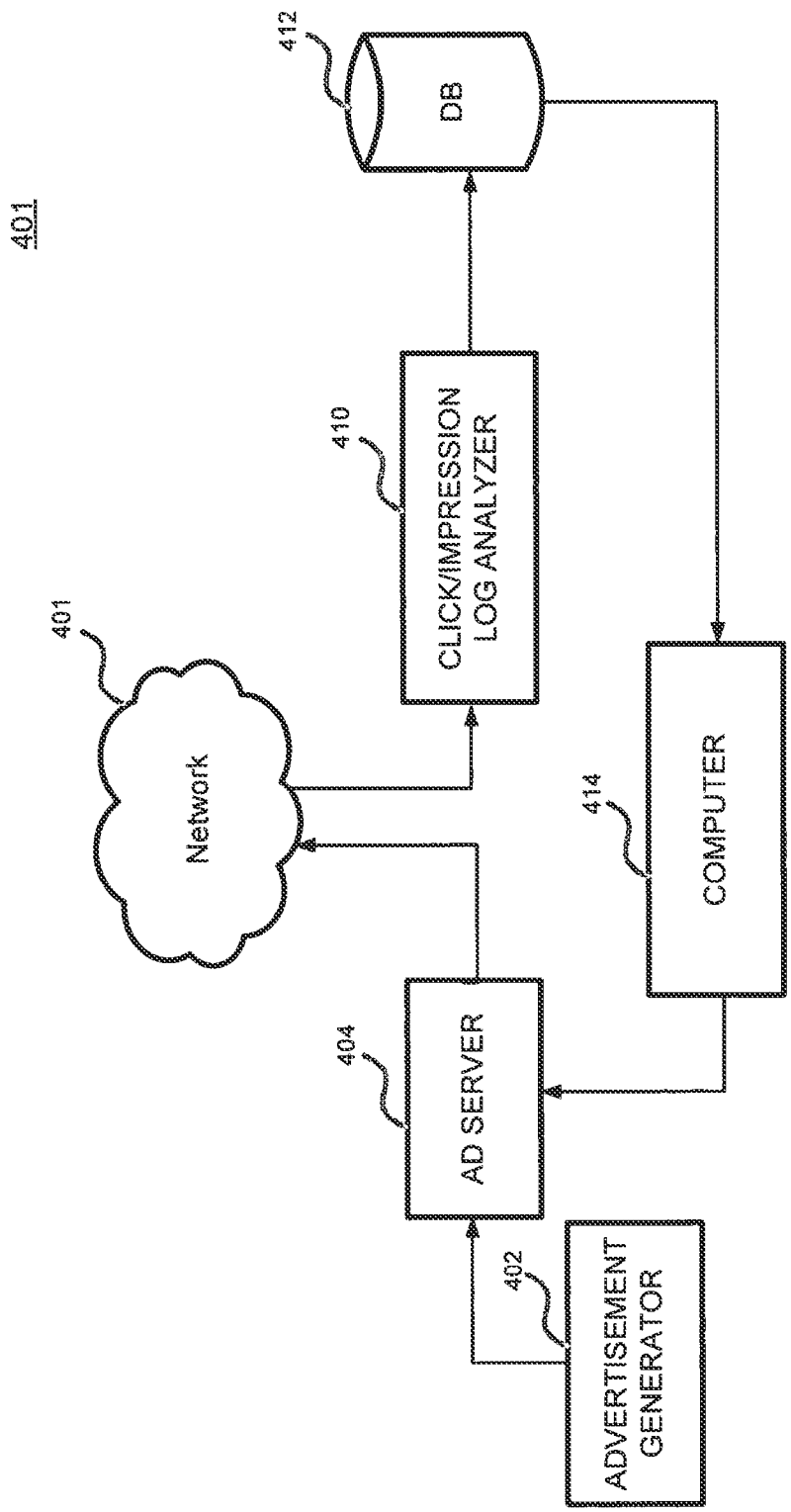
FIG. 4 is a block diagram of an exemplary computer system used to implement the present invention, according to one or more embodiments of the present invention.

FIG. 4 is a block diagram of an exemplary computer system that may be used to implement the present invention, according to one or more embodiments of the present invention. As shown in FIG. 4, according to one or more embodiments, system 400 may include at least one advertisement generating component 402, ad server 404, click/impression log analyzer 410, database 412, computer 414, and a network 401 (e.g., any computer data network that allows communication to occur amongst any/all components of the system). Such a network may be any network and/or combination of networks, including, for example, the Internet. According to such systems, then, advertisements can be delivered by the advertising campaign via any suitable network.

In one embodiment, a content attribute of an advertisement or advertising space may be determined by, for example, classifying the advertisement or advertising space according to, for example, a content type. Additionally, the content type of the advertisement or advertising space may be represented as a feature vector. Determining the content of an advertisement or a advertising space may allow contextually targeted placement of advertisements on the advertising spaces.

The system elements are detailed below, according to one or more embodiments of the present invention. The advertisement generating component 402 can be a machine such as a personal computer with picture making software to create advertisements suitable for display on websites. Ad server 404 can be one or more ad-server computers capable of receiving the advertisements and the instructions about where and when to serve them and carrying out these instructions. In some embodiments, ad server 404 may function as a campaign optimization service 103 or combination of the campaign optimization service and exchange 105 as discussed herein. Network 401 may include a website, such as a website owned by publisher 106, that has agreed (possibly in return for payment) to display the advertisements served by the ad-servers or advertising managers. Network 401 may also include one or more users that view the websites and the advertisements. The click/impression log analyzer 410 is a click/impression analyzer used to determine the results of the showing(s) of the advertisements. The database 412 can be a database used to store the results of the showing(s) of the advertisements. The computer 414 can be a control-related computer used to handle the scheduling of the ads and to provide instructions to the ad-servers, and or implemented consistent with this invention.

Notably, as used herein, the terms "advertisement" or "ad" are also meant to include any content, including information or messages, as well as advertisements, such as, but not limited to, Web banners, product offerings, special non-commercial or commercial messages, or any other displays, graphics, video or audio information. The definitions of other terms used throughout this application, such as "Web page," "Internet," "customer," "user," "revenue," terms related to these terms, and other terms, are set forth more fully in the glossary section below.

Furthermore, in this application, the use of the singular includes the plural unless specifically stated otherwise. In this application, the use of "or" means "and/or" unless stated otherwise. Furthermore, the use of the term "including", as well as other forms, such as "includes" and "included," is not limiting. Also, terms such as "element" or "component" encompass both elements and components comprising one unit and elements and components that comprise more than one subunit unless specifically stated otherwise.

The section headings used herein are for organizational purposes only, and are not to be construed as limiting the subject matter described. All documents cited in this application, including, but not limited to, patents, patent applications, articles, books, and treatises, are expressly incorporated by reference in their entirety for any purpose.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of allocating electronic content for display on a web page, the method comprising the following operations performed by one or more processors of a server:
   receiving, at a first server processor, display data from a second server processor, the data including electronic display space variables corresponding to one or more electronic display spaces of a user device having a first internet web browser type and a first internet protocol (IP) address;
   receiving, at the first server processor, content data from a third server processor, the content data including one or more electronic content variables corresponding to one or more digital content items;
   receiving and saving in a user specific cookie of the user device, user-associated target variable data;
   calculating, by the first server processor, an optimized target inventory percentage based on at least one electronic display space variable associated with the one or more electronic display spaces and by accessing the user-associated target variable data in the user specific cookie;
   continually identifying, by the first server processor, one or more qualified electronic content items that are qualified to receive an impression at the one or more electronic display spaces;
   creating, by the first server processor, a qualified electronic content ranking by sorting the one or more qualified electronic content items by the optimized target inventory percentage;
   based on the qualified electronic content ranking, continually selecting, by the first server processor, one or more qualified electronic content items;
   transmitting the one or more qualified electronic content items selected for on the one or more electronic display spaces; and
   receiving, by an impression log analyzer at a results database, click results of the transmitted one or more qualified electronic content items.

2. The computer-implemented method of claim 1, wherein an initial bid information is received from a user.

3. The computer-implemented method of claim 1, wherein an initial target inventory percentage information is received from a user.

4. The computer-implemented method of claim 1, wherein one or more electronic display spaces are continually collected from a plurality of publisher servers.

5. The computer-implemented method of claim 1, wherein the one or more electronic display spaces is continually collected from one or more user devices.

6. The computer-implemented method of claim 1, wherein each of the one or more electronic display spaces has at least one additional display space variable and each of the one or more electronic content items has at least one additional electronic content variable respectively chosen from the group consisting of: an advertising publication, a publication type, a connection speed, industry, a seasonal attribute, a calendar attribute, a leadback variable, a frequency variable, a demographic characteristic, a content attribute, and a time restraint.

7. The computer-implemented method of claim 1, wherein each of the one or more electronic display spaces limit electronic content impressions based on a predetermined time period.

8. A system for allocating electronic content for display on a web page, the system comprising:
   a storage device that stores a set of instructions;
   at least one processor that executes the set of instructions to:
   receive, at a first server processor, display data from a second server processor, the data including electronic display space variables corresponding to one or more electronic display spaces of a user device having a first internet web browser type and a first internet protocol (IP) address;
   receive, at the first server processor, content data from a third server processor, the content data including one or more electronic content variables corresponding to one or more digital content items;
   receive and save in a user specific cookie of the user device, user-associated target variable data;
   calculate an optimized target inventory percentage based on at least one electronic display space variable associated with the one or more electronic display spaces and by accessing the user-associated target variable data in the user specific cookie;

continually identify one or more qualified electronic content items that are qualified to receive an impression at the one or more electronic display spaces;

create a qualified electronic content ranking by sorting the one or more qualified electronic content items by the optimized target inventory percentage;

based on the qualified electronic content ranking, continually select one or more qualified electronic content items;

transmit and display, by the first server processor, the one or more qualified electronic content items selected on the one or more electronic display spaces; and receiving, by an impression log analyzer at a results database, click results of the transmitted one or more qualified electronic content items.

9. The system of claim 8, wherein an initial bid information is received from a user.

10. The system of claim 8, wherein an initial target inventory percentage information is received from a user.

11. The system of claim 8, wherein one or more electronic display spaces are continually collected from a plurality of publisher servers.

12. The system of claim 8, wherein one or more electronic display spaces are continually collected from a plurality of publisher servers.

13. The system of claim 8, wherein each of the one or more electronic display spaces has at least one additional display space variable and each of the one or more electronic content items has at least one additional electronic content variable respectively chosen from the group consisting of: an advertising publication, a publication type, a connection speed, industry, a seasonal attribute, a calendar attribute, a leadback variable, a frequency variable, a demographic characteristic, a content attribute, and a time restraint.

14. The system of claim 8, wherein each of the one or more electronic display spaces limit electronic content impressions based on a predetermined time period.

15. A non-transitory computer-readable medium that stores instructions for allocating electronic content items for display on a web page, that, when executed by at least one processor, cause the at least one processor to:

receive, at a first server processor, display data from a second server processor, the data including electronic display space variables corresponding to one or more electronic display spaces of a user device having a first internet web browser type and a first internet protocol (IP) address;

receive, at the first server processor, content data from a third server processor, the content data including one or more electronic content variables corresponding to one or more digital content items;

receive and save in a user specific cookie of the user device, user-associated target variable data;

calculate, by the first server processor, an optimized target inventory percentage based on at least one electronic display space variable associated with the one or more electronic display spaces and by accessing the user-associated target variable data in the user specific cookie;

continually identify, by the first server processor, one or more qualified electronic content items that are qualified to receive an impression at the one or more electronic display spaces;

create a qualified electronic content ranking by sorting the one or more qualified electronic content items by the optimized target inventory percentage;

based on the qualified electronic content ranking, continually select, by the first server processor, one or more qualified electronic content items;

transmit and display, by the first server processor, the one or more qualified electronic content items selected on the one or more electronic display spaces; and receiving, by an impression log analyzer at a results database, click results of the transmitted one or more qualified electronic content items.

* * * * *